Aug. 7, 1934.  G. E. NERNEY  1,969,145
EYEGLASS CONSTRUCTION
Filed March 20, 1931

George E. Nerney
INVENTOR

BY   ATTORNEYS

Patented Aug. 7, 1934

1,969,145

UNITED STATES PATENT OFFICE 1,969,145

EYEGLASS CONSTRUCTION

George E. Nerney, Attleboro, Mass., assignor to Bay State Optical Company, Attleboro, Mass., a corporation of Maine Application March 20, 1931, Serial No. 524,049

5 Claims. (Cl. 88—47)

This invention relates to eyeglass construction.

One of the objects of this invention is to provide an eyeglass construction which will be simple and thoroughly durable. Another object of this invention is to provide a device of the above character which shall be of graceful proportions and pleasing appearance. Another object of this invention is to provide a device of the above character which will be inexpensive and of ready manufacture. Another object of this invention is to provide a device of the above character which will be efficient and practical in use. Another object of this invention is to provide a device of the above character which will be light and whose connected parts shall be strong and capable of resisting various stresses. Another object of this invention is to provide a device of the above character adapted to retain the respective lenses in their normal position in a dependable manner with little necessity for repair or substitution of worn parts. Other objects will be in part obvious and in part pointed out hereinafter.

This invention accordingly consists in the features of construction, combinations of elements, and arrangements of parts as will be exemplified in the construction to be hereinafter described and the scope of which will be indicated in the appended claims.

In the accompanying drawing, in which is shown one or more of the various possible embodiments of the several features of this invention:

Similar reference characters refer to similar parts throughout the several views of the drawing.

Figure 1:
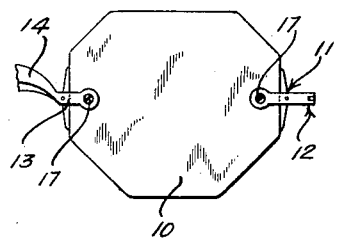
Figure 1 is a side elevation of an eyeglass lens with certain of the parts of an ophthalmic mounting secured thereto, certain other parts being broken away.

Turning now to the drawing in detail, there is illustrated in Figure 1 an eyeglass lens 10, and secured to one end thereof is a lens retaining member generally indicated at 11 having an end piece 12 extending therefrom to be connected to a temple. At the opposite end of lens 10 is a lens retaining means generally indicated at 13 and secured in turn to a bridge 14. Lens 10 may take any convenient shape, for example, octagonal. Thus with an octagonal lens the opposite ends thereof, or more specifically, those portions of the lens engaged by lens retaining members 11 and 13 are substantially parallel. Inasmuch as the dominant features of this invention are clearly illustrated and well adapted to be employed either for connecting a bridge to a lens or a temple to a lens, the construction of one of these lens retaining members only will be described in detail. Thus the construction of lens retaining member 11 and lens retaining member 13 being substantially similar, that of member 11 will be described in detail.

Figure 4:
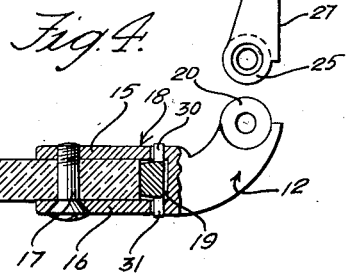
Figure 4 is a cross-section taken along line 4—4 of Figure 2.

Although the means for securing lens 10 to lens retaining means 11 may take various forms, I have shown as an illustrative example of this a saddle generally indicated at 18 (Figure 4), consisting of two arms 15 and 16 respectively extending inwardly from the periphery of the lens to substantially engage the opposite surfaces thereof. The ends of arms 15 and 16 are pierced to form aligned holes and these holes are in substantial registry with a hole extending through lens 10. Thus a screw 17 extends through arm 16 and lens 10 and is threaded into arm 15 to form an interconnection between the opposite arms 15 and 16 of the saddle and lens 10. Arms 15 and 16 are preferably of sufficient length with respect to the distance between screw 17 and the edge of the lens so that the seat 19 of the saddle does not engage the edge of the lens and is a suitable distance therefrom.

Figure 3:
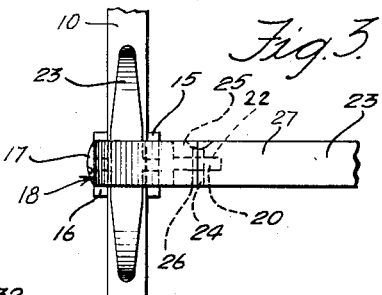
Figure 3 is a side elevation of the parts as shown in Figure 2.

End piece 12 extends outwardly and rearwardly from the seat 19 of saddle 18 and preferably is integral therewith. A lug 20 integral with end piece 12 and extending from the opposite end thereof (Figure 3) is in substantial registry with a slot 22 at one end of a temple 23. For purposes of illustration, temple 23 is shown out of engagement with end piece 12 in Figure 4. A screw or rivet 24 extends through the upper end portion 25 of temple 23, through lug 20, to be threaded into or secured to the lower end portion 26 of the temple bar. Thus the temple bar is pivotally secured to end piece 12 and may move about an axis substantially parallel to the planes of the respective surfaces of lens 10. The inner walls of end piece 12 are substantially rounded and are in registry with the rounded end portions 25 and 26 of the temple. At the outer ends of these walls, however, the end members are substantially at right angles to the outer surface 27 of temple 23. A portion of the wall of end piece 12 is substantially parallel to this portion of the temple bar and when the temple bar is mounted on the end piece, these two walls are in substantial engagement. Thus the temple bar may move about its axis only in a direction toward and away from the rear surface of the lens and preferably not beyond a position substantially at right angles thereto.

Figure 2:
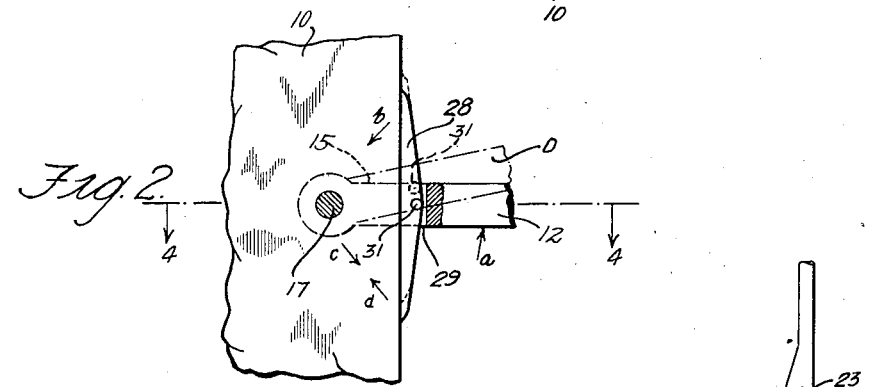
Figure 2 is a front elevation on an enlarged scale of a lens retaining means as mounted, certain of the parts being broken away.

As more clearly shown in Figure 2, a strap 28 engages the edge of the lens and is pivotally mounted within the space 29 between the base 19 of the saddle and the edge of the lens. Strap 28 may be constructed of resilient material, although this is not essential for the practical operation of this construction. The pivotal connection between saddle 18 and strap 28 may take any desired form preferably, however, two lugs 30 and 31 (Figure 4) extend from the opposite sides of strap 28 to be seated in suitably positioned holes near base 19 of the saddle and in arms 15 and 16 thereof respectively. Thus strap 28 is free to move about an axis substantially parallel to screw 17. More specifically, if screw 17 should act as an axis about which end piece 12 might tend to swing, strap 28 would tend to swing about an axis substantially parallel thereto. However, when assembled, the edge of lens 10 preferably lies flush against the inner surface of strap 28. In this case, there is substantially no opportunity for the end piece to swing about screw 17 as an axis, the arc through which such motion might transpire being extremely minute.

It is to be understood that any reference to a direction as "outward" means a direction substantially away from the center of the lens and any reference to a direction as "downward" refers to a direction substantially toward the feet of the wearer. Furthermore, any mention of a direction as "inward" or "upward" refers to directions substantially opposite to those referred to above.

A very common means by which various forms of lens retaining members are broken away from the lenses to which they are secured is by a bending or twisting action of the exterior portions thereof. Referring to Figure 2, it will be seen that if pressure is applied to the lower portion of the end piece as in the direction of arrow "a" and, assuming for purposes of illustration that strap 28 is rigidly secured to the saddle, pressure is exerted on the lens by the strap in the direction of arrow "b" and also by the screw 17 or other securing means in the direction of the arrow "c". Furthermore, the application of such a force tends to push or partially disengage the strap from the lower portion of the edge of the lens. Thus, there is nothing to counteract the force indicated by the arrow "b", for the securing means is being forced in the direction of the arrow "c" and also there is nothing to counteract the force indicated by the arrow "c" for the strap is being forced away from this portion of the edge of the lens. If the force as indicated by the arrow "a" is of sufficient intensity, its combined distribution as described above tends to break the lens retaining member out of the lens. Of course, a force applied to the end piece in an opposite direction from that indicated by arrow "a" would have the opposite effect with substantially the same disastrous result.

I have discovered that by pivotally mounting the strap 28 within the saddle 18 as described above, the action of these various forces is counteracted. For purposes of illustration, let it be assumed that a force is being applied in the direction of arrow "a" (Figure 2) and to illustrate this more clearly I have shown an exaggerated position "D" which the end piece might assume. Of course it is to be understood that this position is purely fanciful for as strap 28 lies close to the edge of the lens, the distance which end piece 12 might move in an upward direction with respect to screw 17 as an axis would be infinitesimal. Assuming the end piece to have moved a minute distance, strap 28 still exerts an equal pressure along the entire length thereof in engagement with the edge of the lens, for as a greater force is applied against the inner surface thereof by the portion of the edge above saddle 18, the strap pivots about its axis to regain its equilibrium. Now no greater force is being applied to the edge of the lens in the direction of the arrow "b" than is also being applied in the direction of an arrow "d". Screw 17, of course, tends to exert pressure against the lens in a direction of arrow "c" but as strap 28 is exerting a force in the direction of arrow "d", these forces counteract each other. Thus the damaging effect of such a force in the direction of arrow "a" and, as described above, also a force in the opposite direction, which may be created by a variety of causes commonly met with in practice, is substantially alleviated. The force so applied to the lens is distributed over a much larger portion of the edge of the lens, which is more capable of resistance without breakage, and further the only large force in one direction, namely, the force in the direction of arrow "c", which might tend to break the lens is counteracted by a substantially equal force in the opposite direction.

Figure 5:
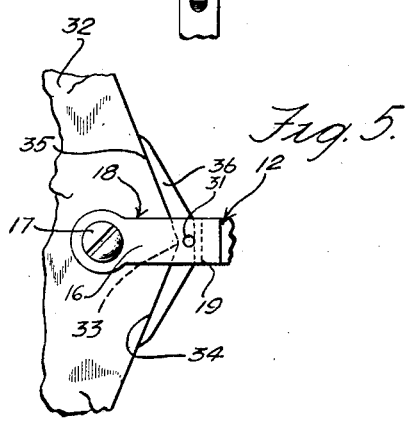
Figure 5 is a front elevation of another embodiment of my invention.

In Figure 5 I have shown a modified embodiment of my construction adapted to be mounted upon a lens 32 in which it is desirable to mount the retaining means at an angular point on the periphery thereof. Thus the saddle 18 embraces the lens in a manner described above, and has extending outwardly and rearwardly therefrom the end piece 12, so that the seat 19 of the saddle is in substantial registry with a point 33 on the periphery of lens 32. Portions 34 and 35 of the edge of the lens extend from point 33 at an angle to the tangential plane thereof. A strap 36 is pivotally secured to saddle 18 in a manner described above, and is so shaped that its inner edge substantially conforms to the periphery of lens 32. The operation of this embodiment is similar to that described above and it will be seen that the advantageous features thereof are achieved in this embodiment.

Figure 6:
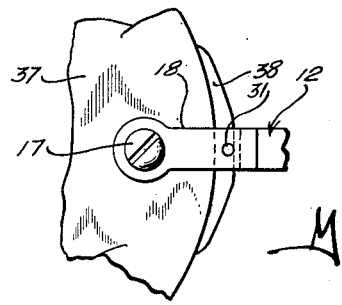
Figure 6 is a front elevation of a further embodiment of my invention.

In Figure 6, the saddle 18 embraces a lens 37, at least a portion of whose periphery is rounded. Thus a strap 38 pivotally mounted to the base of saddle 18 in the manner described above, has its inner engaging edge substantially rounded to conform with the periphery of lens 37. A force in either an upward or downward direction applied to end piece 12 causes strap 38 to pivot about its axis and maintain an inward force along the portion of the edge of lens 37 engaged thereby.

It will be seen that by this thoroughly dependable construction, a lens retaining means is provided which will be considerably more economical in use in that it provides an ample remedy for one of the more common forms of breaking rimless lenses. Furthermore, because of the simple construction of this device, the ultimate cost of producton is not increased materially so that the advantageous features thereof may be enjoyed with small, if any, extra cost.

It will thus be seen that I have provided a thoroughly practical and efficient construction in which the several objects hereinbefore described as well as many others have been successfully and advantageously achieved.

As many possible embodiments may be made of this invention and as many changes might be made in the embodiment above set forth, it is to be understood that all matter hereinbefore set forth or shown in the accompanying drawing is to be interpreted as illustrative and not in a limiting sense.

I claim:

1. In eyeglass construction, in combination, a lens, an endpiece including a body portion and two arms extending inwardly along the opposite surfaces of said lens, an element extending through both of said arms and said lens to pivotally connect said arms to said lens, and a part disposed between said arms and between said body portion and the edge of said lens, said part being pivotally connected to said arms and in substantial engagement throughout its entirety with the edge of said lens, and said part being held by said arms against all relative movement with respect thereto except pivotal.

2. In eyeglass construction, in combination, a lens, an endpiece including a pair of inwardly extending arms engaging the opposite surfaces of said lens, a securing element extending through said lens and both of said arms to connect said endpiece to said lens, the junction between said arms and the body portion of said endpiece being spaced from the edge of said lens, a strap member extending through the space between said body portion and the edge of said lens, said strap member being rigid and in engagement with the edge of said lens, said arms having holes formed therein adjacent said strap member, and means extending into said holes to pivotally connect said strap member to said arms and to prevent any movement of said strap member relative to said endpiece other than pivotal movement whereby said endpiece is firmly secured to said strap member against pivotal movement about said securing element although equal pressure is applied to said edge of said lens regardless of any force applied in any direction to the body portion of said endpiece.

3. In eyeglass construction, in combination, a lens, an endpiece including a pair of arms extending over the opposite surfaces of said lens, means securing said arms to said lens, the body portion of said endpiece being spaced from the edge of said lens to leave a space bordered by said body portion, said arms and the edge of said lens, a strap member extending through said space and engaging the edge of said lens, said arms having holes formed therein and in registry with said space and said strap member, and means extending into said holes and pivotally connecting said strap member to said arms, said strap member being capable of pivotal movement only.

4. In eyeglass construction, in combination, a lens, an eyeglass part including a pair of arms extending inwardly over the edge of said lens, a securing element extending through said arms and said lens to secure said part thereto, the body portion of said part being spaced from the edge of said lens, a strap member extending between said arms, the edge of said lens and said body portion and in engagement with the edge of said lens, said arms having holes formed therein adjacent said strap member, and pin means fitting snugly within said holes to pivotally connect said strap member to said arms.

5. In eyeglass construction, in combination, a lens, an eyeglass part including a pair of arms extending over the opposite surfaces of said lens, means pivotally connecting said arms to said lens, and a strap member mounted exclusively for pivotal movement between said arms at points substantially adjacent the edge of said lens so that said member rests against said edge, said part being held by said arms against all relative movement with respect thereto except pivotal.

GEORGE E. NERNEY.